United States Patent
Fang et al.

(10) Patent No.: US 9,804,909 B1
(45) Date of Patent: Oct. 31, 2017

(54) SCALABLE PREDICTIVE EARLY WARNING SYSTEM FOR DATA BACKUP EVENT LOG

(71) Applicant: EMC Corporation, Hopkinton, MA (US)

(72) Inventors: Chunsheng Fang, Redwood City, CA (US); Derek Lin, San Mateo, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 178 days.

(21) Appl. No.: 14/675,177

(22) Filed: Mar. 31, 2015

Related U.S. Application Data

(60) Provisional application No. 62/107,156, filed on Jan. 23, 2015.

(51) Int. Cl.
- *G06F 11/00* (2006.01)
- *G06F 11/07* (2006.01)
- *G06F 11/14* (2006.01)

(52) U.S. Cl.
CPC ........ *G06F 11/0751* (2013.01); *G06F 11/079* (2013.01); *G06F 11/1451* (2013.01); *G06F 2201/84* (2013.01)

(58) Field of Classification Search
CPC . G06F 2201/84; G06F 11/0751; G06F 11/079
See application file for complete search history.

(56) References Cited

U.S. PATENT DOCUMENTS

| | | | | |
|---|---|---|---|---|
| 5,463,768 A | * | 10/1995 | Cuddihy | G06F 11/079 714/37 |
| 7,664,797 B1 | * | 2/2010 | Weisgerber | G06F 11/1464 707/649 |
| 8,347,151 B2 | * | 1/2013 | Dawson | G06F 11/1464 714/42 |
| 2006/0053261 A1 | * | 3/2006 | Prahlad | G06F 3/0605 711/162 |
| 2015/0149495 A1 | * | 5/2015 | Choi | G06F 17/30386 707/758 |

\* cited by examiner

*Primary Examiner* — Bryce Bonzo
*Assistant Examiner* — Jonathan Gibson
(74) *Attorney, Agent, or Firm* — Van Pelt, Yi & James LLP

(57) ABSTRACT

Techniques to detect backup-related anomalies are disclosed. In various embodiments, a processor is used to generate based at least in part on backup log data associated with a training period a predictive model. The predictive model is to detect, using the processor, anomalies in corresponding backup log data associated with a detection period.

13 Claims, 5 Drawing Sheets

SCALABLE PREDICTIVE EARLY WARNING SYSTEM FOR DATA BACKUP EVENT LOG

CROSS REFERENCE TO OTHER APPLICATIONS

This application claims priority to U.S. Provisional Patent Application No. 62/107,156 entitled SCALABLE PREDICTIVE EARLY WARNING SYSTEM FOR DATA BACKUP EVENT LOG, filed Jan. 23, 2015, which is incorporated herein by reference for all purposes.

BACKGROUND OF THE TECHNOLOGY

Data backup solutions typically are deployed to protect against loss of data, e.g., due to catastrophic or other system failure, human error, etc. Data may be copied to backup media. In the event data as stored on a protected system is lost, the copy stored on the backup media may be used to restore the data to a target system.

Data backup solutions typically generate indexes, logs, and other metadata in connection with backup operations performed by the data backup solution. Such metadata may include, for example, information concerning the number of files or other objects backed up from a system, volume, or other backup data set; the amount of data backed up; etc.

A large enterprise may have an enormous amount of critically important data, stored on numerous systems in locations all around the globe. The backup logs and/or other metadata generated in the connection with regular backup operations for such a large enterprise may be numerous and may be generated and reported by many different backup systems in various locations.

A non-recoverable loss of data may occur if data is deleted or otherwise removed from its primary storage location, e.g., on a system protected by a backup solution, and the data loss is not detected until much later. For example, if under applicable backup data retention policies that last backup copy of the protected data is no longer retained, the data will not be available to be restored from backup media.

BRIEF DESCRIPTION OF THE DRAWINGS

Various embodiments of the invention are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

Use of machine learning techniques to detect anomalies based on backup log or other backup metadata is disclosed. In various embodiments, backup logs are leveraged to generate models to provide actionable predictive results that can help identify backup issues, to take remedial measures and/or gain insights to allow future prescriptive actions. In various embodiments, backup log data from a prior, training period may be used to build a model that can be used to predict normal, expected behavior. Corresponding data from a monitored "detection" period may be analyzed using the model to detect anomalies. Examples include without limitation anomalies associated with the number of files or other objects backed up, the aggregate size of the backup, and/or the time required to perform the backup.

Figure 1:
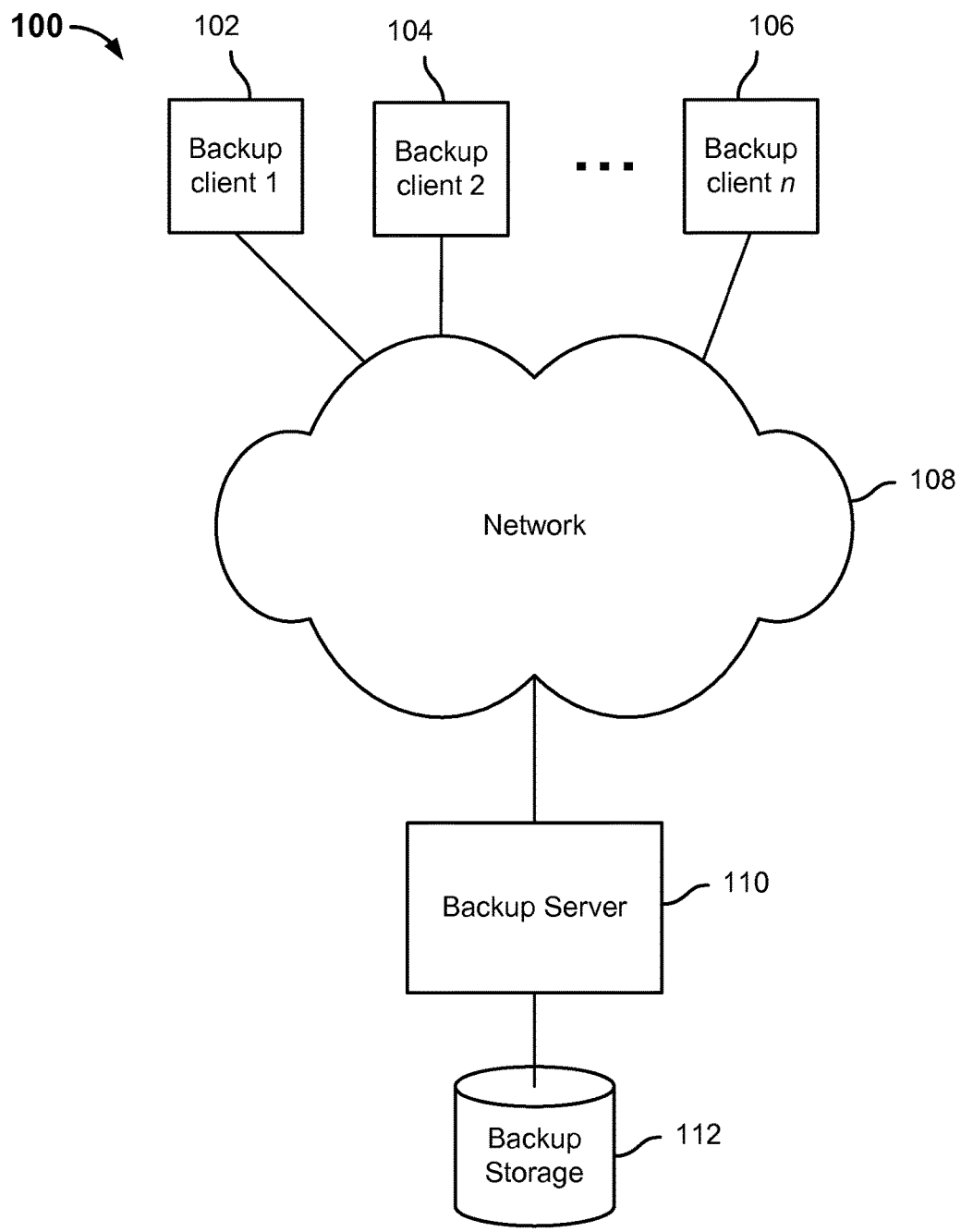
FIG. 1 is a block diagram illustrating an example embodiment of a backup system.

FIG. 1 is a block diagram illustrating an example embodiment of a backup system. In the example shown, backup system 100 includes a plurality of backup clients, represented in FIG. 1 by backup clients 102, 104, and 106. In various embodiments, each backup client may be associated with a protected system on which the backup client is installed, e.g., a file server or other system on which data that is to be protected using backup system 100 is stored. The backup clients 102, 104, and 106 are configured in various embodiments to act as an agent of backup system 100 to coordinate and perform scheduled backups of data stored on the protected system on which the backup client is installed. Backup clients 102, 104, and 106 communicate in various embodiments via network 108, e.g., a local area network, storage area network, etc. with a backup server 110 to store on backup storage 112 a backup copy of data stored on the host on which the backup client is installed.

In connection with performing scheduled backups, backup clients 102, 104, and 106 generate backup logs and/or other metadata that include information about each backup, such as the number of files or other objects that were backed up, the aggregate (total, across files) amount of data that was backed up, the backup start time, stop time, and/or duration, etc.

In various embodiments, backup clients such as backup clients 102, 104, and 106 are configured to report backup logs and/or other backup metadata to a node configured to process the backup logs and/or other metadata (referred collectively herein as backup logs) as disclosed herein to generate a predictive model that can be used to detect anomalies in subsequent backups.

Backup logs for a typical enterprise may be voluminous. In various embodiments, a Big Data architecture, e.g., a massively parallel process (MPP) database and associated architecture, is used to process log data in parallel, enabling models to be generated based on a voluminous amount of backup log data, and the models to be used through parallel processing of backup log from a detection period to detect anomalies. For example, backup logs from a training or model generation period may be processed in parallel to generate one or more models representing normal and expected values for such parameters such as the number of files or other objects backed up, the time to perform backup, the amount of data backed up, etc.

Figure 2:
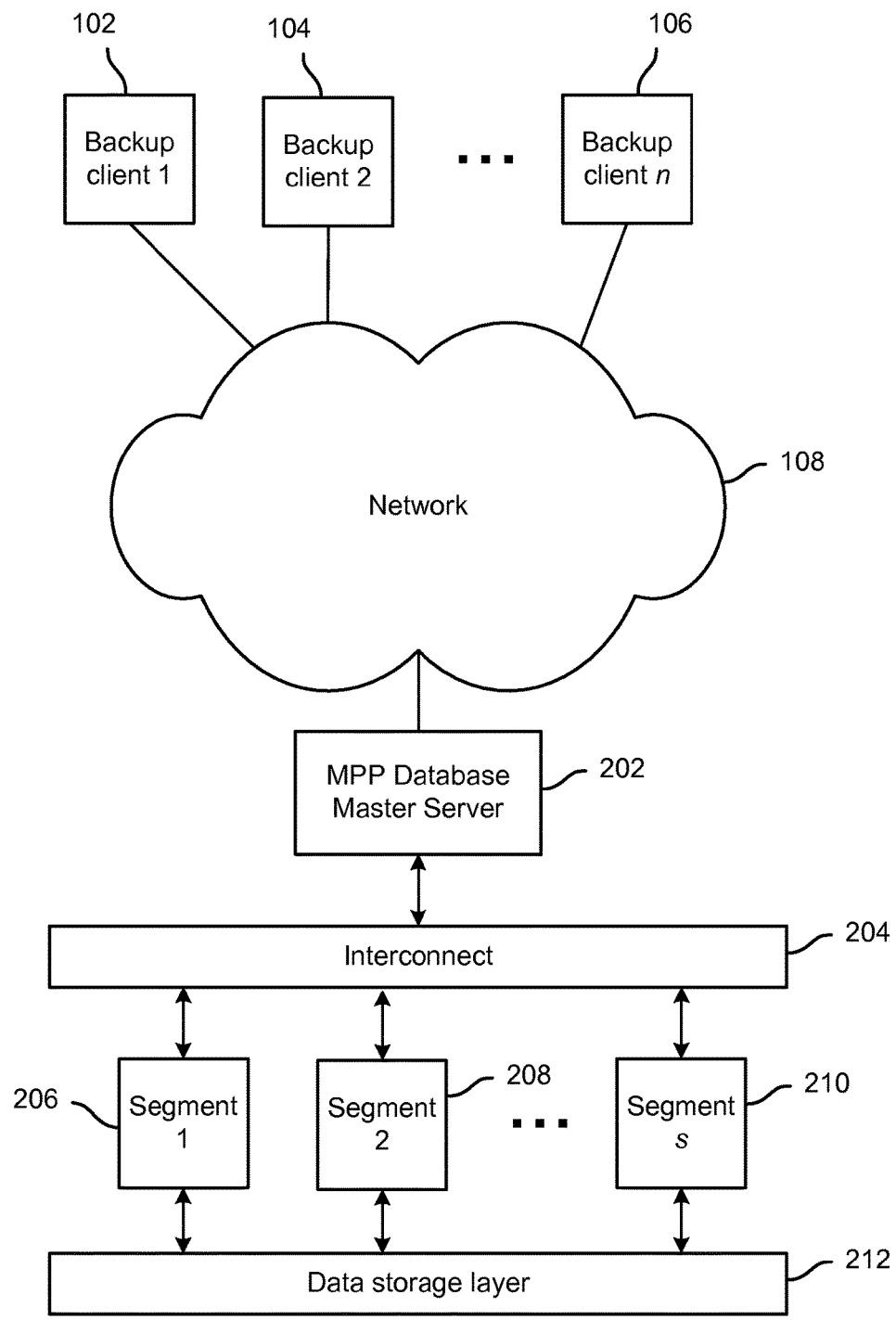
FIG. 2 is a block diagram illustrating an example embodiment of a system to detect anomalous backup related events.

FIG. 2 is a block diagram illustrating an example embodiment of a system to detect anomalous backup related events. In various embodiments, the additional elements shown in FIG. 2 may be used in connection with the backup clients 102, 104, and 106 of FIG. 1 to apply machine learning techniques to detect anomalies based on backup logs, as disclosed herein. In the example shown, the backup clients represented in FIGS. 1 and 2 by backup clients 102, 104, and 106 are configured to provide backup log and/or other backup metadata via network 108 (or in some alternative embodiments a network other than network 108) to a massively parallel processing (MPP) database master server 202. Examples of such a master server include without limitation an EMC® Greenplu® database master server. The master server 202 communicates via an interconnect 204, e.g., an Ethernet or other network protocol-based interconnect, with a plurality of segment servers, represented in FIG. 2 by segment servers 206, 208, and 210. In some embodiments, each segment server is configured to process and store portions of the backup logs reported by backup clients such as backup clients 102, 104, and 106, under the coordination of master server 202. Segments 206, 208, and 210 store the backup log data via a data storage layer 212, which in various embodiments may comprise an abstraction of a data storage system that may itself be a parallel and/or distributed processing system, such as an Apache® Hadoop® system.

In various embodiments, the MPP database system of FIG. 2 is configured to process backup log data in parallel. For each protected system and/or data set, for example, machine learning techniques may be applied to backup log data from a "training" period to generate a predictive model. The predictive model may be used during a future "test" or "detection" period to detect anomalies in backup logs associated with backups performed outside the training period. In various embodiments, the predictive model provides for a feature set or vector generated based on detection period backup log data a probability that the observed feature set or vector would occur. Observed feature sets or vectors that are determined based on the model to have a probability of occurrence that is lower than a detection threshold may be determined to be anomalous. In various embodiments, responsive action may be taken, such as generated a notification to prompt backup administrators to investigate.

In various embodiments, the training period data used to generate the model may comprise time series data, including for each of a set of one or more features a corresponding value for each associated time or time period. For example, for a daily/nightly backup, training data may be processed for a prescribed/selected number of days. The time series data may be processed, using an MPP or other Big Data architecture, to generate models of normal and expected behavior. The model(s) may then be used to detect anomalies in corresponding time series data extracted from backup logs generated during a detection period. Anomaly thresholds may be set, e.g., iteratively and/or otherwise by data analysts or other networks, to achieve a desired fidelity in detecting anomalies (e.g., not too many false positives or false negatives).

In various embodiments, one or more of the following machine learning models may be used, depending on such factors as the modeling accuracy that may be required and/or desired, the time scope over which anomalies are to be detected (e.g., short range comparison or longer range), computing speed, etc.: Gaussian hypothesis testing; KS Test; and Kernel Density Estimation. The considerations weighed in various embodiments to select a modeling method may include one or more characteristics listed in the following table:

|  | Gaussian Hypothesis Testing | KS Test | Kernel Density Estimation |
| --- | --- | --- | --- |
| Modeling Accuracy | LOW | MEDIUM | HIGH |
| Multi Modal? | NO | YES | YES |
| Parametric? | YES | NON | NON |
| Anomaly Detection Time Scope | Short range, e.g. daily | Long range, e.g. quarter, year | Short range, e.g. daily |
| Computing Speed | Fast. <1 sec. | Medium. ~1 sec. | Medium. ~3 sec. |
| In-DB Tool | SQL | MADLIB | PL/R |

Figure 3:
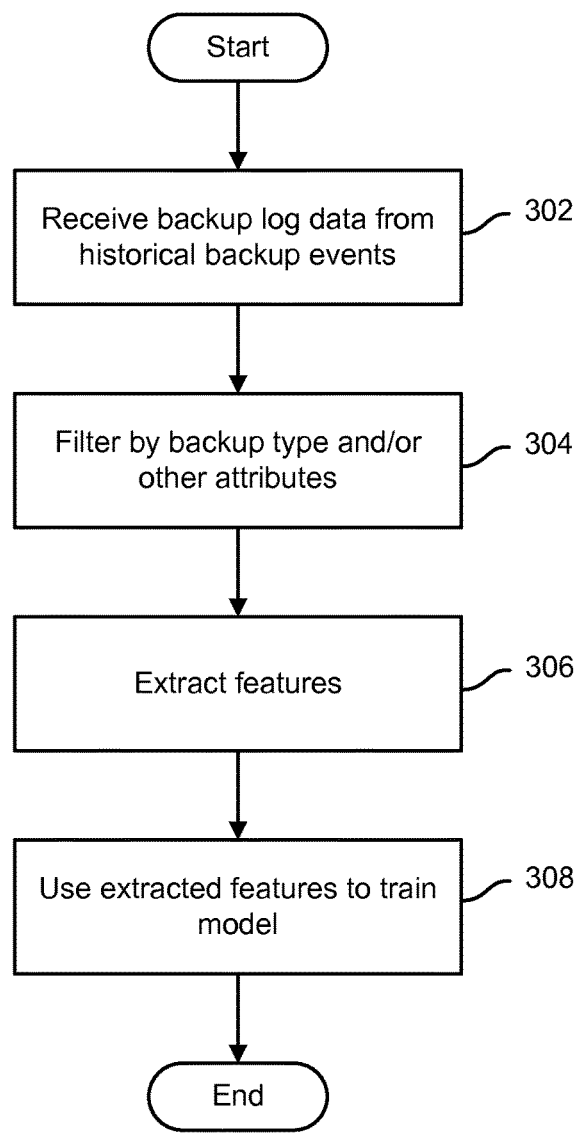
FIG. 3 is a flow chart illustrating an example embodiment of a process to generate a model based on backup log data.

FIG. 3 is a flow chart illustrating an example embodiment of a process to generate a model based on backup log data. In various embodiments, the process of FIG. 3 may be implemented by an MPP database system, such as the one shown in FIG. 2. In the example shown, backup log data from historical backup events, e.g., backups that were performed during a "training" period, is received (302). For example, backup log data may be received from numerous backup clients, such as backup clients 102, 104, and 106 of FIG. 1. Each backup client may provide its backup log data on a schedule independent of the others and/or in parallel with one or with many other backup clients. The MPP database system implementing the process of FIG. 3, in various embodiments, processes, analyzes, and stores backup log data from a plurality of backup clients in parallel. The backup log data is filtered by backup type (e.g., full backup, in which all data is copied; incremental backup, in which only data that has changed since a last prior backup is copied; etc.) and/or one or more other attributes, such as source system, data set, source system type, etc. (304). In various embodiments, filtering enables backup log data to be used to generate separate models for separate sets of training data, each of which may be expected to exhibit characteristic and/or "normal" behavior that may be expected to be similar within the filtered set but potential different from the normal" behavior associated with backup logs filtered into another set. For example, incremental backups on a type of source system on which a lot of data objects may be stored but only a relatively small number of objects may be newly created and/or modified between backups, such as a file server, may include a relatively high number of objects but a relatively small amount of aggregate data. Similarly, full backups may exhibit different characteristics (e.g., number of objects backed up, amount of data backed up, backup operation duration) than incremental backups performed on the same or same type of system. In various embodiments, the criteria and/or dimensions used to filter are selected by data scientists based on the characteristics of various potential cross-sections of the backup log data.

Within each filtered set of backup log data (304), a prescribed set of features is extracted (306). The raw backup log data may be voluminous. In various embodiments, backup logs are parsed and values corresponding to prescribed features are extracted and stored, e.g., as a feature set or vector, a set of name-value pairs, etc. Examples of features that may be extracted in various embodiments include, without limitation, backup type, number of files or other objects backed up, aggregate amount of data backed up, backup duration, etc. In various embodiments, backup logs for a same protected system and/or data set are received over time. Features are extracted from each and stored as a time series of feature sets, vectors, etc. The time series data are used to "train" (i.e., generate) a predictive model (308), such as a statistical model.

Figure 4:
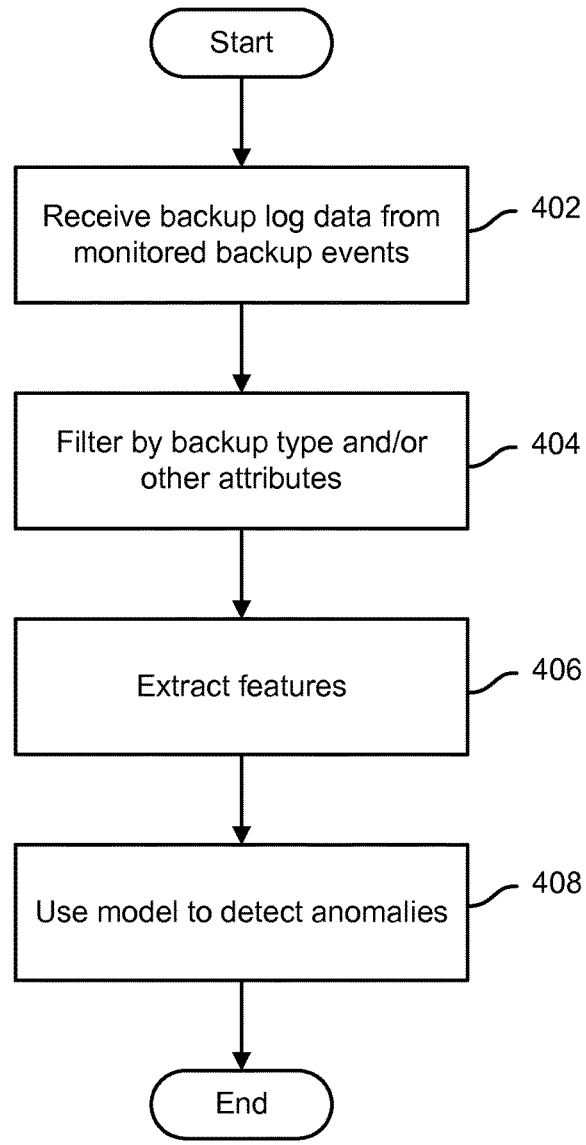
FIG. 4 is a flow chart illustrating an example embodiment of a process to detect anomalous backup related events.

FIG. 4 is a flow chart illustrating an example embodiment of a process to detect anomalous backup related events. In various embodiments, the process of FIG. 4 may be implemented by an MPP database system, such as the one shown in FIG. 2. In the example shown, backup log data from monitored backup events, e.g., logs for backup operations performed during a "detection" period, are received (402). The received backup logs are filtered (404). In various embodiments, the received backup logs are filtered (404) using the same filtering criteria as in step 304 of FIG. 3, to generate one or more filtered sets of backup log data, each of which corresponds to a time series of filtered backup log data from the training period. For each filtered set, and within each filtered set for each protected system and/or data set for which a separate predictive model was generated (e.g., as in step 308 of FIG. 3), features corresponding to the features used to generate the associated model are extracted (406). The extracted features are used to detect anomalies (408). For example, in various embodiments, for each set of features observed in the detection period the associated model may provide a probability of that feature set occurring. The probability may be compared to a detection threshold, and responsive action may be taken in the event the probability is lower than the detection threshold.

In various embodiments, anomalies may be detected and used to generate notifications. In some embodiments, for each of at least a subset of detected anomalies, a review/analysis task may be generated, e.g., programmatically, and assigned programmatically to a queue of tasks. Administrators may then pull tasks from the queue and evaluate whether the anomaly reflects an actual or potential loss of data. For example, an anomaly may result in an administrator determining that a portion of a protected data set is no longer stored on a production server, resulting in the corresponding backup data set being smaller, which may have been detected as an anomaly based on the backup logs. The administrator may check with a business owner of the data to determine whether the data was deleted intentionally, or instead has been deleted or otherwise removed in error. Backup data may still be available to restore the data to the production server. Without model based anomaly detection as disclosed herein, by contrast, the loss of data may not have been detected until the backup copy of the data was no longer available, e.g., based on an applicable backup and/or retention policy.

Figure 5:
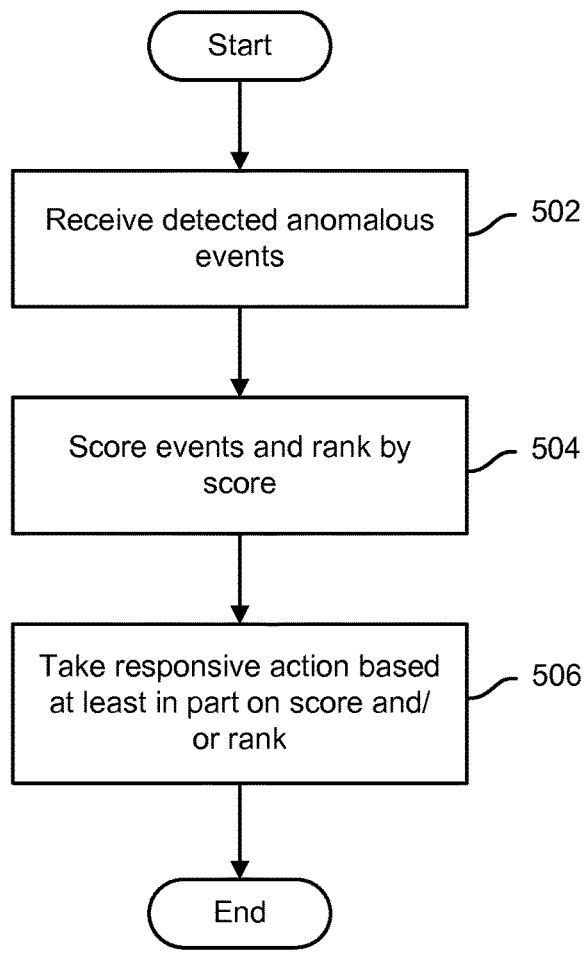
FIG. 5 is a flow chart illustrating an example embodiment of a process to respond to anomalous backup related events.

FIG. 5 is a flow chart illustrating an example embodiment of a process to respond to anomalous backup related events. In various embodiments, the process of FIG. 5 may be implemented by an MPP database system, such as the one shown in FIG. 2, and/or may be used to respond to anomalies detected as in step 408 of the process of FIG. 4. In the example shown, backup-related events that have been detected as being anomalous are received (502). For example, for each anomaly detected as in step 408 of FIG. 4, a corresponding anomalous backup event data may be generated and place in a queue of detected anomalies. The events are scored and then ranked based on the score (504). For example, scores may be assigned based on one or more measures of the amount by which a feature set associated with an anomalous event differs from a feature set that would be more expected based on the associated predictive model. In some embodiments, the scoring may be weighted, e.g., by assigning greater weight to deviations along one dimension (e.g., aggregate backup data amount or size) than another (e.g., backup duration). In various embodiments, scoring and ranking anomalous backup events may enable administrative resources to be used more effectively, e.g., by focusing first on the events that marked the greatest departure from what would be expected given the corresponding model. Responsive action is taken based at least in part on the scores and resulting ranking (506). For example, events may be pulled in ranked order from a queue and assigned as tasks to administrative users, e.g., to cause such users to investigate anomalous events and resolve and issues that are found. For example, investigation of an anomaly that was detected based on an unexpected change in the aggregate amount of data that was included in a backup operation performed during the detection period may reveal that a significant amount of data was deleted in error from the source system. Backup data stored at a time prior to the erroneous deletion of the data may be used, for example, to restore the data to the source system.

In some embodiments, a visualization may be provided to enable anomalies to be highlighted visually to a user. For example, in some embodiments a relatively darker color in a display portion associated with the "detection" period may represent a relatively low amount of data was backed up compared to the larger amounts seen during the corresponding "test" or model generation period, enabling the anomalous region to be focused in on by visual inspection.

In various embodiments, techniques disclosed herein may enable losses of data to be avoided, for example by helping to ensure that the deletion of data in error from a source system is detected in time to recover the data from backup data, i.e., before the last backup copy of the data had been deleted at the end of an applicable retention period.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting backup related anomalies, comprising:
   filtering backup log data associated with one or more backup clients during a training period into one or more sets of backup log data based on one or more attributes;
   extracting from a set of the one or more sets of backup log data a prescribed set of features;
   generating, using a processor, based at least in part on the extracted prescribed set of features, a predictive model;
   using, by the processor, the predictive model to detect anomalies in backup log data associated with the one or more backup clients during a detection period, wherein the anomalies at least includes data being erroneously deleted;
   computing a score for a detected anomaly; and performing one or more responsive actions based at least in part on a comparison between the computed score and a detection threshold, wherein a responsive action includes a processor using backup data stored at a prior time to restore the erroneously deleted data.

2. The method of claim 1, further comprising receiving via a network communication interface said backup log data associated with the training period.

3. The method of claim 2, further comprising receiving via the network communication interface said backup log data associated with the one or more backup clients during the detection period.

4. The method of claim 1, wherein said one or more attributes include one or more of the following: backup type; backup schedule; backup size; number of objects backed up; source system type; and other source system attribute.

5. The method of claim 1, wherein the prescribed set of features include one or more of the following: backup size; number of objects backed up; and amount of change in backup data size.

6. The method of claim 1, wherein the predictive model is associated with one or more of the following model types Gaussian hypothesis testing; KS test; and Kernel Density Estimation.

7. The method of claim 1, wherein the predictive model is configured to be used to predict for a given set of extracted features associated with a backup performed during the detection period a corresponding statistical probability of occurrence of said given set of features.

8. The method of claim 1, further comprising ranking detected anomalies based at least in part on their respective scores.

9. The method of claim 1, wherein the one or more responsive actions are performed based at least in part on a determination that the computed score exceeds a detection threshold.

10. A system to detect backup related anomalies, comprising:
a communication interface; and
a processor coupled to the communication interface and configured to:
receive via the communication interface backup log data associated with one or more backup clients during a training period;
filter the backup log data associated with the one or more backup clients during the training period into one or more sets of backup log data based on one or more attributes;
extracting from a set of the one or more sets of backup log data a prescribed set of features;
generate a predictive model based at least in part on the extracted prescribed set of features;
use the predictive model to detect anomalies in backup log data associated with the one or more clients during a detection period, wherein the anomalies at least includes data being erroneously deleted;
compute a score for a detected anomaly; and
perform one or more responsive actions based at least in part on a comparison between the computed score and a detection threshold, wherein a responsive action includes a processor using backup data stored at a prior time to restore the erroneously deleted data.

11. The system of claim 10, wherein said one or more attributes include one or more of the following: backup type; backup schedule; backup size; number of objects backed up; source system type; and other source system attribute.

12. The system of claim 10, wherein the prescribed set of features include one or more of the following: backup size; number of objects backed up; and amount of change in backup data size.

13. A computer program product to detect backup related anomalies, the computer program product being embodied in a non-transitory computer readable storage medium and comprising computer instructions for:
filtering backup log data associated with one or more backup clients during a training period into one or more sets of backup log data based on one or more attributes;
extracting from a set of the one or more sets of backup log data a prescribed set of features;
generating, using a processor, based at least in part on the extracted prescribed set of features, a predictive model;
using, by the processor, the predictive model to detect anomalies in backup log data associated with the one or more backup clients during a detection period, wherein the anomalies at least includes data being erroneously deleted;
computing a score for a detected anomaly; and
performing one or more responsive actions based at least in part on a comparison between the computed score and a detection threshold, wherein a responsive action includes a processor using backup data stored at a prior time to restore the erroneously deleted data.

* * * * *